United States Patent

Fujii et al.

[11] Patent Number: 5,658,514
[45] Date of Patent: Aug. 19, 1997

[54] METHOD FOR PRODUCING THERMOPLASTIC RESIN SHEET OR FILM

[75] Inventors: Atsushi Fujii; Akira Funaki; Tohru Yukumoto, all of Himeji, Japan

[73] Assignee: Idemitsu Petrochemical Co., Ltd., Tokyo, Japan

[21] Appl. No.: 384,478

[22] Filed: Feb. 1, 1995

Related U.S. Application Data

[63] Continuation of Ser. No. 199,489, Feb. 22, 1994, abandoned.

[30] Foreign Application Priority Data

Mar. 4, 1993 [JP] Japan ................................. 5-067389

[51] Int. Cl.⁶ ............................................... B29C 47/90
[52] U.S. Cl. ........................... 264/210.2; 264/210.6; 264/211.12; 264/237; 425/327
[58] Field of Search ............................ 264/348, 237, 264/173.1, 210.1, 210.2, 210.7, 210.6, 211.12, 280; 425/327, 325

[56] References Cited

U.S. PATENT DOCUMENTS

| | | | |
|---|---|---|---|
| 4,049,589 | 9/1977 | Sakane | 264/210.1 |
| 4,548,778 | 10/1985 | Fujii | 264/178 R |
| 5,026,778 | 6/1991 | Fujii et al. | 264/176.1 |
| 5,084,519 | 1/1992 | Ishibashi | 264/210.1 |
| 5,169,583 | 12/1992 | Moriguchi et al. | 264/348 |
| 5,204,037 | 4/1993 | Fujii | 264/171 |
| 5,211,899 | 5/1993 | Fujii | 264/210.2 |

FOREIGN PATENT DOCUMENTS

| | | |
|---|---|---|
| 0 352 241 | 1/1990 | European Pat. Off. |
| 0 496 260 | 7/1992 | European Pat. Off. |
| 60-236719 | 11/1985 | Japan |
| 61-24977 | 6/1986 | Japan |
| 61-32572 | 7/1986 | Japan |
| 62-42822 | 2/1987 | Japan |
| 62-10816 | 3/1987 | Japan |
| 62-41457 | 9/1987 | Japan |
| 62-284719 | 12/1987 | Japan |

OTHER PUBLICATIONS

Patent Abstracts of Japan, vol. 13, No. 506 (M–892) (3854), 14 Nov. 1989 of JP-A-01 204 716 (Hosokawa Yoko), 17 Aug. 1989.
Patent Abstracts of Japan, vol. 5, No. 123 (M–82) (795), 8 Aug. 1981 of JP-A-56 062 122 (Shinkoube Denki), 27 May 1981.
Patent Abstracts of Japan, vol. 12, No. 282 (M726) (3129), 3 Aug. 1988 of JP-A-63 060 726 (Toppan Printing), 16 Mar. 1988.

*Primary Examiner*—Mathieu D. Vargot
*Attorney, Agent, or Firm*—Frishauf, Holtz, Goodman, Langer & Chick, P.C.

[57] ABSTRACT

A method for producing a thermoplastic resin sheet or film, wherein a raw resin material containing one or more of the following additives: a nucleating agent, fine powder of a high melting point polymer, a petroleum resin, a terpene resin and an organic peroxide (and/or a crystalline polypropylenic copolymer) is melted under heat to form a resin sheet or film, the resulting resin sheet or film is brought into contact with and adhered to the outer surface of a cooling roll having a mirror-finished surface or the outer surface of an endless metal belt having a mirror-finished surface and then it is moved along with the roll or the belt, thereafter it is inserted, pressed and cooled between the outer surface of the cooling roll and the outer surface of the endless metal belt. The non-oriented sheet or film thus produced has a high surface gloss, a high surface smoothness and a high transparency and is suitable for wrapping foods and medicines.

29 Claims, 5 Drawing Sheets

METHOD FOR PRODUCING THERMOPLASTIC RESIN SHEET OR FILM

This application is a continuation, of application Ser. No. 08/199,489, filed Feb. 22, 1994, now abandoned.

FIELD OF THE INVENTION

The present invention relates to a method for efficiently producing a non-stretched, super-transparent sheet or film of a thermoplastic resin, which is favorable for use as wrapping materials for foods and medicines, etc.

PRIOR ART AND BACKGROUND OF THE INVENTION

Sheets or films made of crystalline thermoplastic resins, especially polypropylene resins, have different physical properties such as transparency, depending on the crystalline morphology thereof. Heretofore, the use of polypropylene resins has been limited though the resins have excellent physical properties such as heat resistance, moisture-proofness and oil resistance and they are lightweight and cause no environmental pollution. This is because when the resins are shaped into sheets or further into containers from the shaped sheets, the sheets and the containers have poor transparency.

In order to make polypropylene resin sheets transparent, it is necessary to make both surfaces of the sheet glossy and additionally to make the inside of the sheet transparent. To make both surfaces of the sheet glossy, for example, there is known a method of transferring a roll mirror face to them, a method of transferring a metal mirror face to them using an endless belt having the face, a method of increasing the surface gloss of a melt web extruded from a die, etc. On the other hand, in order to make the inside of the sheet transparent, for example, there are known (a) a method of inhibiting crystallization of the sheet or letting the sheet have fine crystals (having a particle size smaller than the minimum wavelength of visible rays) by modifying the raw materials, (b) a method of inhibiting crystallization of the sheet by rapidly cooling it, (c) a method of breaking the crystals in the sheet by stretching or orientation, etc.

Accordingly, various methods comprising of these means as combined have heretofore been proposed. For instance, there has been proposed a method of transferring a roll mirror face to the surfaces of a resin sheet while a nucleating agent is added to the raw resin, whereby both surfaces of the resin sheet are made glossy while the inside of the sheet is made transparent. According to the method, however, it is difficult to form a thin sheet and the transparency of the sheet formed is not complete.

Apart from the above, another method has also been proposed, in which a roll mirror face is transferred to both surfaces of a resin sheet while the sheet is rolled under pressure. According to the method, however, since the sheet is stretched and oriented by rolling under pressure, there occur various problems that the physical properties of the sheet in the MD direction and the TD direction become unbalanced and the thermal shapability of the sheet becomes poor.

In addition, transferring methods using a mirror face-having an endless metal belt have been disclosed in, for example, JP-B 61-24977, 61-32572, JP-A 62-284719. (The terms "JP-A" and "JP-B" as used herein mean an "unexamined published Japanese patent application" and an "examined Japanese patent publication", respectively.) However, the transparency of the sheets to be produced by such methods is still unsatisfactory.

On the ether hand, the present applicant has heretofore proposed various techniques for controlling crystallization of polypropylene resin sheets or films by rapidly cooling them, as the means of improving their transparency without stretching the sheets or films (for example, JP-B 62-41457, 62-10816, JP-A 62-42822, 60-236719) and has already put them into practical use.

Recently, further improvement in the quality of sheet products and also in the their productivity has been desired. Given the situation, however, the conventional methods have various problems. For example, if the production speed is further elevated, the shear stress at the extrusion die increases to form a so-called shark skin on the surface of the sheet formed whereby the surface gloss of the sheet is lowered or, that is, the transparency thereof is lowered. In addition, if the thickness of the sheet to be formed is 0.6 mm or more, the transparency thereof is rapidly lowered due to the limit of the thermal conductivity in the direction of the thickness of the sheet. Accordingly, in view of the object of improving the productivity, a method of producing resin sheets at a higher speed is desired. In addition, also desired is a method of producing thick and highly-transparent resin sheets.

For these, the present applicant has already proposed a method for improving the transparency of a resin sheet, using an endless metal belt that was mirror-finished to have a surface roughness of 1.5 µm or less for treating a resin sheet, in which a particular resin material composition is used so as to inhibit the crystallization of the sheet to be formed therefrom while the both surfaces of the sheet formed are made glossy with the belt, as the method for further improving the prior art techniques (Japanese Patent Application No. 4-27485).

However, the method still had various problems. When the temperatures of the roll and the belt used in the method are low, the sheet formed is often banked so that the outward appearance of the sheet becomes bad, rapid cooling of the sheet formed is impossible, and much time is needed for producing a thin sheet.

SUMMARY OF THE INVENTION

The object present invention is to overcome the above-mentioned problems in the prior art techniques and to provide a method for efficiently producing a thermoplastic resin sheet or film having a high surface gloss, a high surface smoothness and a high transparency.

First, the present invention provides a method for producing a thermoplastic resin sheet or film, wherein a raw resin material to which have been added one or more additives selected from the group consisting of a nucleating agent, fine powder of a high melting point polymer, a petroleum resin, a terpene resin and an organic peroxide is melted under heat to form a resin sheet or film, the resulting resin sheet or film is brought into contact with and adhered to the outer surface of a cooling roll having a mirror-finished surface or the outer surface of an endless metal belt having a mirror-finished surface and then moved along with the roll or the belt, and thereafter it is inserted, pressed and cooled between the outer surface of said cooling roll and the outer surface of said endless metal belt.

Secondly, the present invention provides a method for producing a thermoplastic resin sheet or film, wherein a raw resin material to which have been added one or more additives selected from the group consisting of a nucleating agent, fine powder of a high melting point polymer, a petroleum resin, a terpene resin, an organic peroxide and a crystalline polypropylenic copolymer is melted under heat to form a resin sheet or film, the resulting resin sheet or film is inserted into the intermediate space between a cooling roll having a mirror-finished surface and an endless metal belt having a mirror-finished surface, then it is moved and cooled while being kept in contact with the outer surface of said cooling roll between said cooling roll and said endless metal belt, and thereafter it is pressed from the inside of said endless metal belt, then it is released from the contact with said cooling roll, and it is further moved while being kept adhered to said endless metal belt and then peeled from the belt.

BRIEF EXPLANATION OF THE DRAWINGS

In these drawings, 1 is an extruder, 2 is a T-die, 3 is a sheet or film, 4 is an outer cooling roll, 5 is an endless metal belt, 6 is a pressure roll, 7 is a first inner cooling roll, 8 is an auxiliary inner cooling roll, 9 is a second inner cooling roll, 10 is an auxiliary outer cooling roll, 11 is an inner pressure device, 12 is a planet roll, 21 is an extruder, 22 is a T-die, 23 is a sheet or film, 24 is an endless metal belt, 25A and 25B are cooling rolls, 26 is an auxiliary roll.

In these drawings, 31 is an extruder, 32 is a T-die, 33 is a sheet or film, 34 is an outer cooling roll, 35 is an endless metal belt, 36 is an inner cooling roll, 37 is a inner cooling pressure roll, 38 is an auxiliary inner cooling roll, 39 is an auxiliary outer cooling roll, 40 is a hydraulic pressure device, 41 is a planet roll, 42 is an extruder, 43 is a T-die, 44 is a sheet or film, 45 is an endless metal belt, 46A and 46B are cooling rolls, and 47 is an auxiliary roll.

DETAILED DESCRIPTION OF THE INVENTION

The thermoplastic resin to be used in the present invention as the essential raw material for the sheet or film is not specifically defined but may be not only a crystalline resin such as polypropylene, polyethylene, polyethylene terephthalate and so on but also a non-crystalline (amorphous) resin such as polystyrene, polycarbonate, polyvinyl chloride, polymethyl methacrylate and so on. Of these, however, preferred are crystalline resins, especially polypropylenic resins (including propylene homopolymer, crystalline propylenic copolymers comprising one or more comonomers, and their mixtures). The sheet or film of the present invention includes not only a single-layered sheet or film but also a multi-layered (laminate) sheet or film.

In particular, in the first method of the present invention, the polypropylene resin preferably used as the essential raw material for the sheet or film is not specifically defined, including, for example, propylene homopolymer, polypropylenic random copolymers, polypropylenic block copolymers, etc. Such may be used singly or as a mixture of two or more of them.

According to the first method of the present invention, a raw material resin comprising a thermoplastic resin such as that mentioned above, to which have been added one or more additives selected from the group consisting of a nucleating agent, fine powder of a high melting point polymer, a petroleum resin, a terpene resin and an organic peroxide, is filmed through a T-die or the like.

According to the second method of the present invention, a raw material resin comprising a thermoplastic resin such as that mentioned above, to which have been added one or more additives selected from the group consisting of a nucleating agent, fine powder of a high melting point polymer, a petroleum resin, a terpene resin, an organic peroxide and a crystalline polypropylenic copolymer is directed through a T-die or the like.

The nucleating agent to be employed in the present invention comprises one or more chosen from among talc, organic carboxylic acids and their metal salts, metal salts of organic phosphoric acids, polyvinylcycloalkanes, and dibenzylidene-sorbitol derivatives of a general formula (I):

wherein R represents anyone of an alkyl group having from 1 to 8 carbon atoms, a halogen atom and an alkoxy group having from 1 to 4 carbon atoms, and plural R's in the formula, if any, may be the same or different ones, and m and n each represent an integer of from 0 to 3.

According to the present invention, the nucleating agent may be added to the thermoplastic resin in an amount of from 0.5 to 10000 ppm by weight, preferably from 100 to 4000 ppm by weight, relative to the resin. If the proportion of the nucleating agent is less than 0.5 ppm by weight, the transparency of the resin sheet or film to be produced by the invention will be unsatisfactory. However, if it is more than 10000 ppm by weight, the agent will bleed out to the surface of the resin sheet or film. Such are unfavorable.

As the high melting point polymer for use in the present invention, mentioned are, for example, high melting point polymers having a melting point of 200° C. or higher, such as polycarbonates, nylons, etc. The present invention employs fine powder (having a particle size of 1 μm or less) of such a high melting point polymer.

According to the present invention, the fine powder of such a high melting point polymer may be added to the thermoplastic resin in an amount of from 0.5 to 10000 ppm by weight, preferably from 100 to 4000 ppm by weight, relative to the resin. If the proportion of the fine powder is less than 0.5 ppm by weight, the transparency of the resin sheet or film to be produced by the invention will be unsatisfactory. However, if it is more than 10000 ppm by weight, the sheet or film will be cloudy to lower its transparency. Such are unfavorable.

As the petroleum resin, for example, employable in the present invention is an aliphatic petroleum resin having a molecular weight of from 500 to 5000 and a softening point of from 50° to 170° C. In place of the petroleum resin, also usable is a terpene resin.

According to the present invention, the petroleum resin or terpene resin may be added to the thermoplastic resin in an amount of from 3 to 30% by weight, preferably from 5 to 15 % by weight, relative to the resin. If the proportion of the petroleum resin or terpene resin is less than 3% by weight, its effect for improving the transparency of the resin sheet or film to be produced by the present invention will be unsatisfactory. However, if it is more than 30% by weight, the sheet or film will be brittle. Such are unfavorable.

The present invention may also employ an organic peroxide as the additive. In this case, the thermoplastic resin such as that mentioned above is decomposed under heat in the presence of the organic peroxide and the thus-obtained, decomposed thermoplastic resin is used as the raw resin material.

The organic peroxide employable in the present invention is not specifically defined but it must be handled with ease in industrial operation and must be effective. For instance, preferred are organic peroxides having a half-life period of 0.5 minutes or longer at 150° C.

As specific examples of such organic peroxides, mentioned are, for example, 2,5-dimethyl-2,5-di(t-butylperoxy) hexane, 1,1-bis(t-butylperoxy)-3,3,5-trimethylcyclohexane, t-butylperoxy-isopropyl carbonate, t-butylperoxy-3,3,5-trimethylhexanoate, 1,3-bis(2-t-butylperoxyisopropyl) benzene, etc.

The amount of the organic peroxide to be added to the raw resin material may be determined suitably, considering the melt indices (MI) of the starting raw material and the intended resin composition, the decomposition temperature and time of the organic peroxide, etc. The thermal decomposition of the thermoplastic resin, using the organic peroxide such as that mentioned above, may be carried out by any known method. For instance, a mixture prepared by mixing the thermoplastic resin and the organic peroxide may be heated, using a Bumbury's mixer, a roll, an extruder, etc. Above all, a continuous extruder is preferably used for this purpose.

In the second method of the present invention, also usable as the additive is a crystalline polypropylenic copolymer.

The crystalline polypropylenic copolymer may be anyone of random copolymers, block copolymers and grafted copolymers. In view of the economical aspect, preferred are random copolymers and block copolymers.

As random copolymers, preferred are α-olefin-propylene random copolymers. Of these, especially preferred are ethylene-propylene random copolymers having MI of 10 g/10 min or less and containing ethylene in an amount of from 1 to 20% by weight.

If the ethylene content in these ethylene-propylene random copolymers is less than 1% by weight, their effect of improving the transparency of the shaped products will be in vain, but if it is more than 20% by weight, the crystallinity of the resulting copolymers will be insufficient so that their effect of improving the transparency of the shaped products will be lowered. Such are unfavorable.

As block copolymers, preferred are α-olefin-propylene block copolymers. Of these, especially preferred are ethylene-propylene block copolymers having MI of 10 g/10 min or less and containing ethylene in an amount of from 1 to 40% by weight.

If the ethylene content in these ethylene-propylene random copolymers is less than 1% by weight, their effect of improving the transparency of the shaped products will be in vain, but if it is more than 40% by weight, the whiteness of the shaped products will be substantial, which would be unfavorable.

It is sufficient that one of the above-mentioned crystalline polypropylenic copolymers is added to the raw resin material of the present invention, but two or more of them may also be added thereto. In particular, a combination of the random copolymer and the block copolymer is preferred, as it improves all the more the surface gloss and the transparency of the shaped products. Especially preferred is a combination of the ethylene-propylene random copolymer having MI of 10 g/10 min or less and an ethylene content of from 1 to 20% by weight and the ethylene-propylene block Copolymer having MI of 10 g/10 min or less and an ethylene content of from 1 to 40% by weight.

The crystalline polypropylenic copolymer may be added to the thermoplastic resin in an amount of from 0.2 to 40 parts by weight, preferably from 1.0 to 30 parts by weight, relative to 100 parts by weight of the resin.

If the proportion of the crystalline polypropylenic copolymer is less than 0.2 parts by weight, its effect of reducing the size of spherical crystals formed in the sheet or film produced by the present invention will be lowered so that its effect of improving the transparency of the shaped products will be in vain. On the other hand, if it is more than 40 parts by weight, the shaped products will become gradually more whitish or will become uneven due to the uneven kneading of the raw resin material composition, which is unfavorable. In particular, if the proportion of the crystalline polypropylenic copolymer is from 1.0 to 30 parts by weight, its effect of improving the transparency of the shaped products is substantially favorable.

According to the present invention, the raw resin material composition comprising a thermoplastic resin to which have been added one or more of the above-mentioned additives is melted under heat to form a resin sheet or film. The formation of the resin sheet or film may be carried out by any known method. In general, a T-die method, a calender roll method and the like are employed. Of these, a T-die method is preferred in view of the easiness of its operation. More concretely, for example, using a T-die extruder, the above-mentioned raw resin material composition is melted and kneaded under heat at temperatures of from 200° to 280° C., and the resulting resin melt is extruded through the T-die to form a resin sheet or film.

According to the present invention, even a thick sheet or film having a thickness of more than 0.6 mm and having a relatively high transparency may be obtained. However, the thickness of the sheet or film to be obtained by the present invention is preferably 1 mm or less. If the thickness of the sheet or film is more than 1 mm, its internal haze will be increased due to its thickness so that its transparency will be lowered unfavorably, though its surface gloss is still good.

In the sheet or film thus obtained in the manner mentioned above, the scattering of light in its inside is relatively small or, that is, its internal haze is relatively small due to the intrinsic properties of the raw resin material, and therefore the transparency of the sheet or film is high. According to the present invention, however, the sheet or film is cooled and subjected to treatment for increasing its surface gloss in the manner mentioned below, to thereby improve more its transparency.

Figure 1:
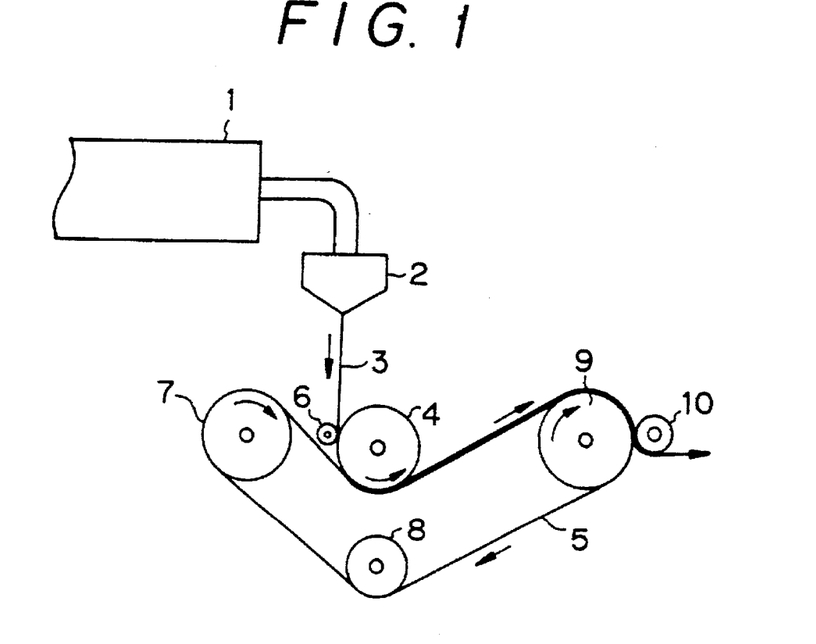
FIG. 1 is an explanatory view showing the first embodiment of the device to be used in carrying out the first method of the present invention.
Figure 2:
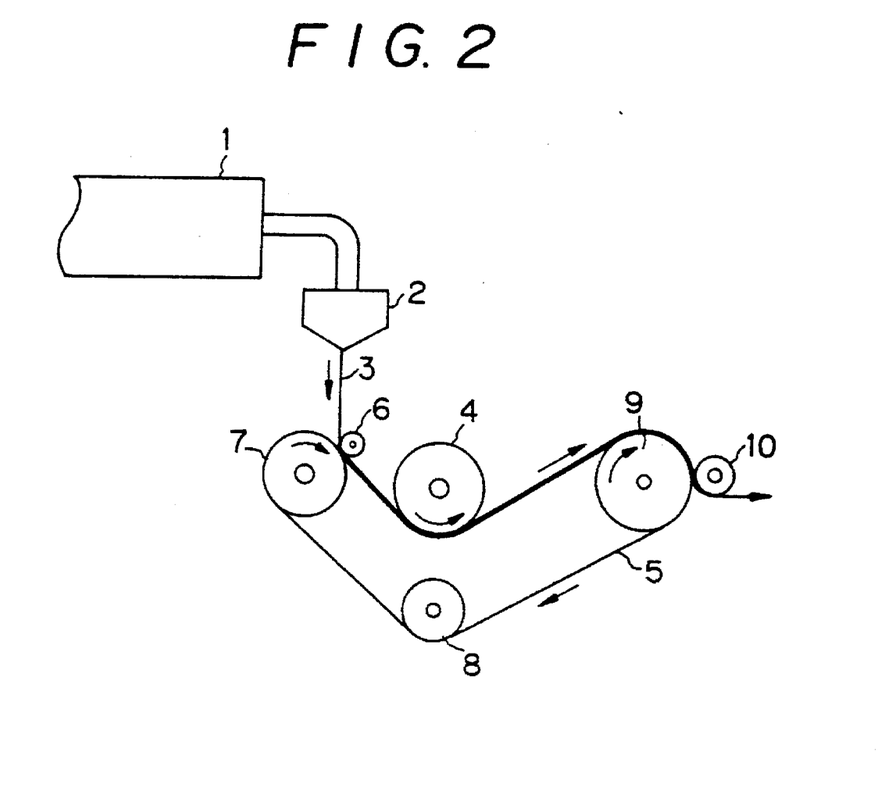
FIG. 2 is an explanatory view showing the second embodiment of the device to be used in carrying out the first method of the present invention.
Figure 3:
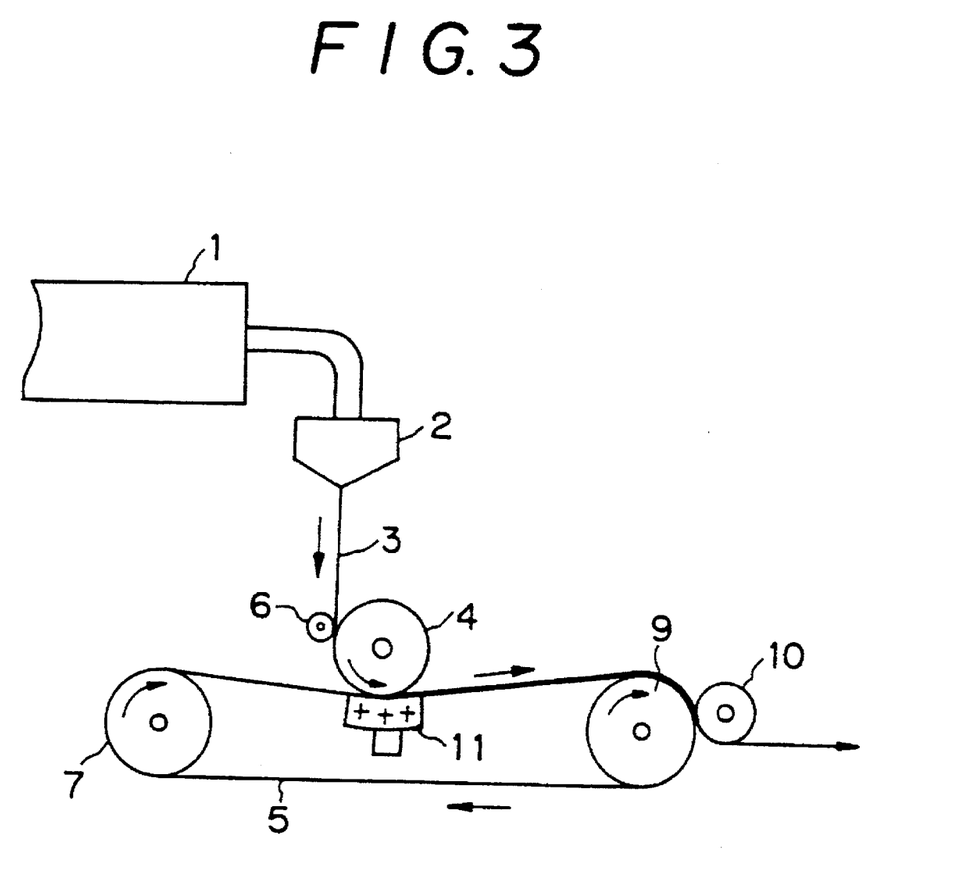
FIG. 3 is an explanatory view showing the third embodiment of the device to be used in carrying out the first method of the present invention.
Figure 4:
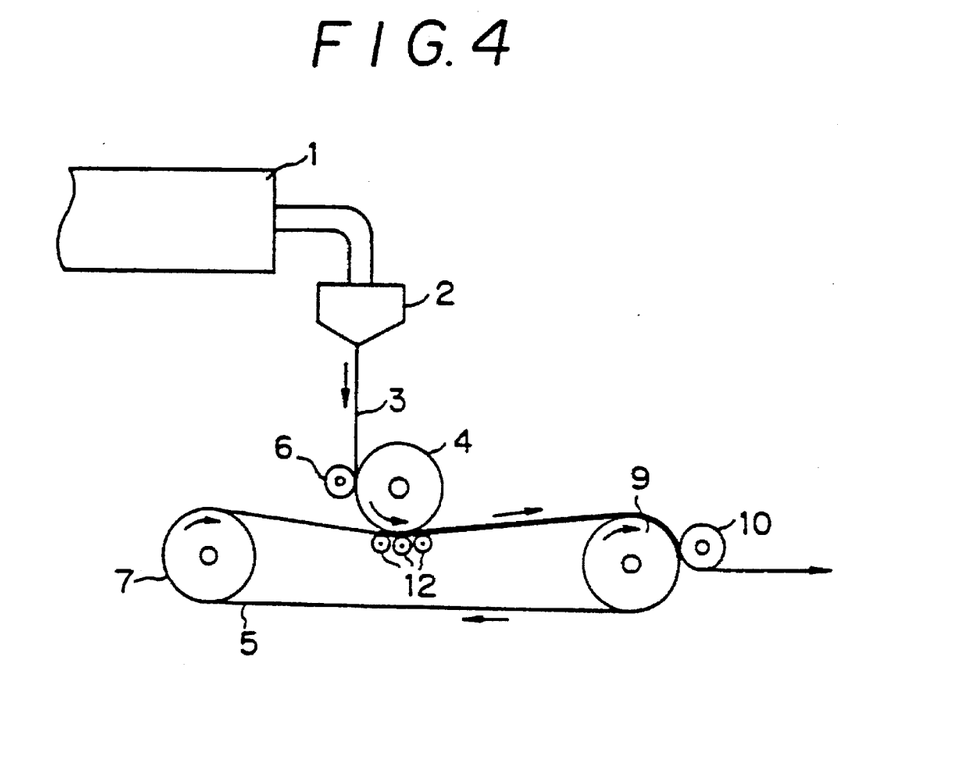
FIG. 4 is an explanatory view showing the fourth embodiment of the device to be used in carrying out the first method of the present invention.

Now, the first method of the present invention will be explained hereunder, with reference to the drawings. FIG. 1 is an explanatory view showing the first embodiment of the device to be used in carrying out the first method of the present invention. FIG. 2 is an explanatory view showing the second embodiment of the device to be used in carrying out the first method of the present invention. FIG. 3 is an explanatory view showing the third embodiment of the device to be used in carrying out the first method of the present invention. FIG. 4 is an explanatory view showing the fourth embodiment of the device to be used in carrying out the first method of the present invention.

Precisely, a raw resin material composition such as that mentioned above is put in an extruder 1, and the resulting resin melt is extruded while hot through a T-die 2 and filmed to obtain a sheet or film 3 (a sheet or film from the resin melt).

Next, the sheet or film 3 is directly brought into contact with and adhered to the outer surface of a cooling roll 4 having a mirror-finished surface, as shown in FIG. 1, or to the outer surface of an endless metal belt 5 having a mirror-finished surface, as shown in FIG. 2, optionally via a pressure roll 6 having a non-sticking surface.

When the sheet or film 3 is applied to the cooling roll 4 or the endless metal belt 5, if the adhesiveness of the former to the latter is not good (for example, if air exists between them), the sheet or film 3 will be unevenly glazed. In order to evade the problem, it is recommended to use the pressure roll 6 as mentioned above or to press the sheet or film 3 to the roll 4 or the belt 5 by pneumatic pressure in order to ensure the adhesion between them.

After the sheet or film 3 has been kept in contact with and adhered to the outer surface of the cooling roll 4 having a mirror-finished surface or the outer surface of the endless metal belt 5 having a mirror-finished surface, the former is inserted between the cooling roll 4 and the endless metal belt 5, moved under pressure and cooled while being kept in contact with the cooling roll 4 between the roll 4 and the belt 5.

In this process, in general, an endless metal belt made of a stainless steel, carbon steel or titanium alloy, preferably made of a stainless steel, is used as the belt 5.

The endless metal belt 5 to be used generally has a thickness of approximately from 0.4 to 1.0 mm. The endless metal belt 5 of this type is generally run at a relatively high speed of from 18 to 36 m/min.

The endless metal belt 5 shall have a mirror-finished surface having a surface roughness of 3.0 μm or less, preferably 1.0 μm or less, more preferably 0.5 μm or less.

The endless metal belt 5 is cooled with a first inner cooling roll 7 and a second inner cooling roll 9 or with these rolls and an auxiliary inner cooling roll 8 which is optionally provided in the device. The embodiments illustrated by FIG. 1 and FIG. 2 have the auxiliary inner cooling roll 8 along with the first inner cooling roll 7 and the second inner cooling roll 9 all in the inside area of the endless metal belt 5.

On the other hand, the cooling roll 4 also shall have a mirror-finished surface, like the above-mentioned endless metal belt 5. It is desired that the cooling roll 4 has a large diameter, but in practical use, it is preferred that the diameter is approximately from 100 to 1000 mm.

The temperatures of the endless metal belt 5 and the cooling roll 4 generally fall within the range of from 10° to 90° C. The lower the temperatures of the endless metal belt 5 and the cooling roll. 4, the higher the transparency of the shaped products (or the lower the internal haze thereof). However, if the temperatures are lower than 10° C., the roll 4 or the belt 5 will be wet with due or banks will be formed to give bank marks to the surface of the shaped sheet or film 3 due to the rapid cooling. On the contrary, if the temperatures are too high, the sheet or film 3 could not be cooled to solidification so that the transparency of the shaped products will be lowered.

Therefore, in the present invention, the temperatures of the endless metal belt 5 and the cooling roll 4 are generally within the range of from 10° to 90° C., preferably from their dew points to 40° C.

Regarding the temperatures of the cooling roll 4 and the endless metal belt 5, it is desired that the temperature of the endless metal belt 5 is made higher than that of the cooling roll 4, in order that the sheet or film 3 may be moved along with the belt 5 while being adhered thereto. In particular, it is recommended that the temperature of the endless metal belt 5 is made higher than that of the cooling roll 4 by 5° C. or more, preferably 10° C. or more.

After the sheet or film 3 has been kept in contact with and adhered to the outer surface of the cooling roll 4 having a mirror-finished surface or to the outer surface of the endless metal belt 5, as mentioned above, it is inserted between the endless metal belt 5 and the cooling roll 4 (outer cooling roll) located outside the belt loop and moved therebetween under pressure while being kept in contact with the outer surface of the cooling roll 4, whereby the sheet or film 3 is cooled to a predetermined temperature.

Afterwards, the sheet or film 3 is released from the contact with the cooling roll 4, then it is moved further while being kept adhered to the endless metal belt 5, and optionally after further cooled with a second auxiliary inner cooling roll 9 or the like, it is peeled from the belt 5.

As mentioned above, the sheet or film 3 is sandwiched under pressure and cooled between the cooling roll 4 and the endless metal belt 5 for a predetermined period of time (or in a predetermined area).

The contact area where the sheet or film 3 is kept sandwiched under pressure between the roll and the belt is difficult to indiscriminately determine, since it varies, depending on the take-up speed and the thickness of the sheet or film 3, the temperatures of the belt and the roll and other conditions. In terms of time, in general, it may be for about one second. It is necessary that the sheet or film 3 is cooled to such a temperature that no spherical crystals are formed in the sheet or film 3, at the end point of the contact area or at the outlet from the cooling roll 4.

The pressure to be imparted to the sheet or film 3 between the cooling roll 4 and the endless metal belt 5 is from 1 to 20 kg/cm$^2$, preferably from 1 to 10 kg/cm$^2$, in terms of a plane pressure. If the pressure is too small, a sheet or film having good transparency and surface gloss cannot be obtained. On the contrary, if it is too large, the sheet or film will be unfavorably oriented or wrinkled.

As the means for imparting the pressure to the sheet or film 3, an inner hydraulic pressure device 11 may be employed as shown in FIG. 3, or planet rolls 12 may be employed as shown in FIG. 4. It is desired that these are also cooled. The embodiments illustrated by FIG. 3 and FIG. 4 are such that the inner pressure device 11 or the planet rolls 12 is/are applied to the sheet or film 3 that has been kept in contact with and adhered to the outer surface of the cooling roll 4 having a mirror-finished roll 4, like in FIG. 1, but these are not limitative. Apart from these, the device 11 or rolls 12 may be applied to the sheet or film 3 that has been kept in contact with and adhered to the outer surface of the endless metal belt 5 having a mirror-finished surface, like in FIG. 2.

After the sheet or film 3 has been cooled in the manner mentioned above, it is wound up around a take-up roll (not shown) to be a final product.

Figure 6:
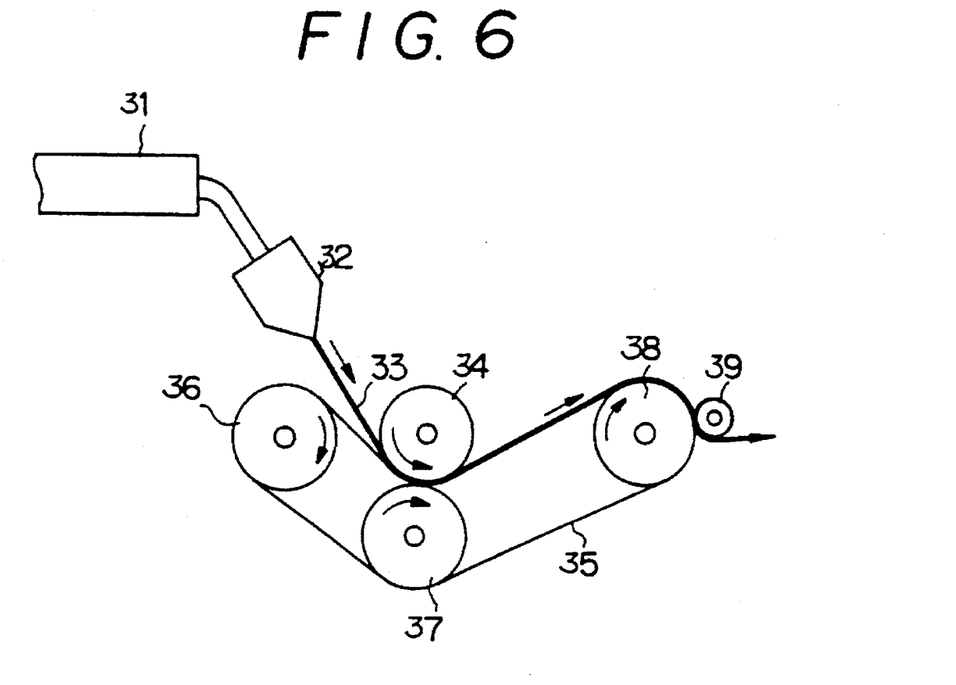
FIG. 6 is an explanatory view showing the first embodiment of the device to be used in carrying out the second method of the present invention.
Figure 7:
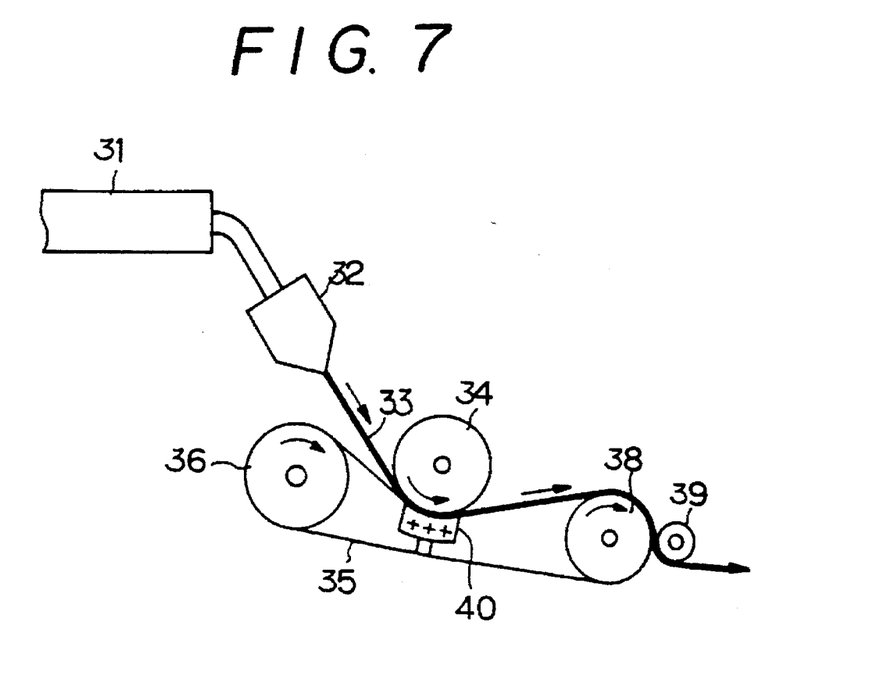
FIG. 7 is an explanatory view showing the second embodiment of the device to be used in carrying out the second method of the present invention.
Figure 8:
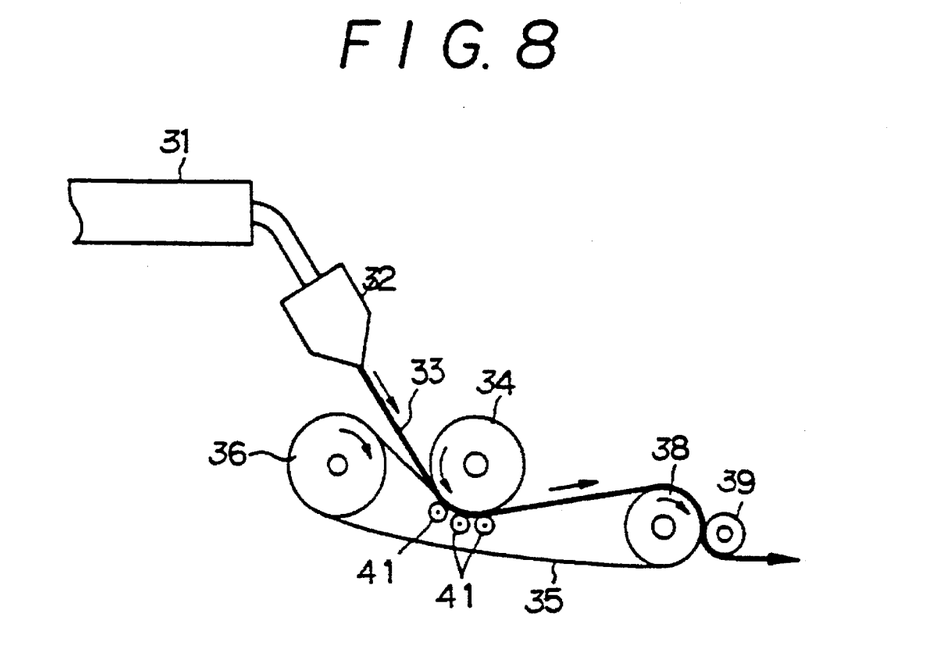
FIG. 8 is an explanatory view showing the third embodiment of the device to be used in carrying out the second method of the present invention.

Next, the second method of the present invention will be explained, with reference to the drawings. FIG. 6 is an explanatory view showing the first embodiment of the device to be used in carrying out the second method of the present invention. FIG. 7 is an explanatory view showing the second embodiment of the device to be used in carrying out the second method of the present invention. FIG. 8 is an explanatory view showing the third embodiment of the device to be used in carrying out the second method of the present invention.

Precisely, a raw resin material composition such as that mentioned above is put in an extruder 31, and the resulting resin melt is extruded while hot through a T-die 32 and filmed to obtain a sheet or film 33 (a sheet of film from the resin melt).

Next, the sheet or film 33 is directly introduced between the outer surface of a cooling roll 34 having a mirror-finished surface and the outer surface of an endless metal belt 35 having a mirror-finished surface.

According to the second method of the present invention, the sheet or film 33 is introduced between the outer surface of the cooling roll 34 having a mirror-finished surface and the outer surface of the endless metal belt 35 having a mirror-finished surface, as mentioned above, and the thus-introduced sheet or film 33 is moved and cooled while being kept in contact with the outer surface of the cooling roll 34 between the cooling roll 34 and the endless metal belt 35 (or while being sandwiched therebetween).

More concretely, the sheet or film 33 is introduced into the intermediate between the endless metal belt 35 and the cooling roll 34 located outside the belt loop, then it is moved along the outer surface of the cooling roll 34 between the cooling roll 34 and the endless metal belt 35. In addition, while being moved, it is cooled.

For the introduction of the sheet or film 33, if it is first brought into contact with either of the cooling roll 34 and the endless metal belt 35, the sheet or film 33 will be frequently wrinkled. For the reason, it is desired that the sheet or film 33 is introduced into the intermediate part (almost the center part) of the area in which the cooling roll and the endless metal belt are kept in contact with each other.

In this process, in general, an endless metal belt made of a stainless steel, carbon steel or titanium alloy, preferably made of a stainless steel, is used as the belt 35.

The endless metal belt 35 to be used generally has a thickness of approximately from 0.4 to 1.0 mm. The endless metal belt 35 of this type is generally run at a relatively high speed of from 18 to 36 m/min.

The endless metal belt 35 shall have a mirror-finished surface having a surface roughness of 1.5 μm or less, preferably 0.2 μm or less, more preferably 0.05 μm or less.

The endless metal belt 35 is cooled with an inner cooling roll 36 or with the inner cooling roll 36 and an inner cooling pressure roll 37 (if desired, these rolls may have an additional function for driving the belt 35). An auxiliary inner cooling roll 38 is located in the inside of the endless metal belt 35, as will be mentioned hereinafter.

The cooling roll 34 shall have a mirror-finished surface, like the endless metal belt 35. The cooling roll 34 is desired to have a large diameter, but in practical use, it is preferred that its diameter is approximately from 100 to 1000 mm.

The temperatures of the endless metal belt 35 and the cooling roll 34 generally fall within the range of from 10° to 50° C. The lower the temperatures of the endless metal belt 35 and the cooling roll 34, the higher the transparency of the shaped products (or the lower the internal haze thereof). However, if the temperatures are lower than 10° C., the roll 34 or the belt 35 will be wet with due or banks will be formed to give bank marks to the surface of the shaped sheet or film 33 due to the rapid cooling. On the contrary, if the temperatures are too high, the sheet or film 33 could not be cooled to solidification so that the transparency of the shaped products will be lowered.

Therefore, in the present invention, the temperatures of the endless metal belt 35 and the cooling roll 34 are generally within the range of from 10° to 50° C., preferably from their dew points to 40° C.

Regarding the temperatures of the cooling roll 34 and the endless metal belt 35, it is desired that the temperature of the endless metal belt 35 is made higher than that of the cooling roll 34, in order that the sheet or film 33 may be moved along with the belt 35 while being adhered thereto. In particular, it is recommended that the temperature of the endless metal belt 35 is made higher than that of the cooling roll 34 by 5° C. or more, preferably 10° C. or more.

As mentioned above, the sheet or film 33 is introduced into the intermediate between the endless metal belt 35 and the cooling roll 34 (inner cooling roll) located outside the belt loop, and then it is moved along the outer surface of the cooling roll 34 between the cooling roll 34 and the endless metal belt 35. During the movement, the sheet or film 33 is cooled to a predetermined temperature.

Next, the sheet or film 33 is pressed from the inside of the endless metal belt 35, using an inner cooling pressure roll 37, then it is released from the contact with the cooling roll 34 and moved while being adhered to the endless metal belt 35, and optionally after further cooled with an auxiliary inner cooling roll 38 or the like, it is peeled from the belt 35.

According to the present invention, it is necessary that the pressure is imparted to the sheet or film 33 by the inner cooling pressure roll 37, after the sheet or film 33 has been introduced into the intermediate between the endless metal belt 35 and the cooling roll 34 located outside the belt loop and then moved along the outer surface of the cooling roll 34 between the cooling roll 34 and the endless metal belt 35. In other words, it is necessary that the inner cooling pressure roll 37 is located in the downstream after the cooling roll 34.

If the inner cooling pressure roll 37 is not located in the downstream after the cooling roll 34 or, for example, if the inner cooling pressure roll 37 is located almost at the same position as the cooling roll 34 to face to the latter via the endless metal belt 35 in the inside of the belt loop, the sheet or film 33 is to be pressed by the pressure roll 37 almost at the same time when it is introduced between the roll 34 and the belt 35 so that the sheet or film 33 is inevitably wrinkled which is unfavorable. In order to prevent the sheet or film 33 from being wrinkled, the tension of the sheet or film 33 may be increased. In the case, however, the sheet or film 33 will be oriented.

It is again to be noted that, according to the second method of the present invention, the point at which the endless metal belt 35 is pushed by the inner cooling pressure roll 37 must indispensably be positioned later than the point at which the cooling roll 34 is first brought into contact with the endless metal belt 35. The point at which the endless metal belt 35 is pushed by the inner cooling pressure roll 37 cannot be determined indiscriminately, as varying depending on the speed and the temperature of the sheet or film 33 being treated.

As mentioned above, the sheet or film 33 is pressed by the inner cooling pressure roll 37, after it has been sandwiched under pressure and cooled between the cooling roll 34 and the endless metal belt 35 for a predetermined period of time (or in a predetermined area) and, as a result, both surfaces of the sheet or film 33 are compressed by the cooling roll 34 and the endless metal belt 35 pushed by the inner pressure roll 37.

The contact area where the sheet or film 33 is kept sandwiched under pressure between the roll and the belt is difficult to indiscriminately determine, since it varies, depending on the take-up speed and the thickness of the sheet or film 33, the temperatures of the belt and the roll and other conditions. In general terms, it may be approximately from 10 to 300 mm. It is necessary that the sheet or film 33 is cooled to such a temperature that no spherical crystals are formed in the sheet or film 33, at the end point of the contact area or at the outlet from the cooling roll 34.

The endless metal belt 35 is pushed to the cooling roll 34 by the inner cooling pressure roll 37 located inside the belt loop, so that the sheet or film 33 that has been introduced between them is pressed by the cooling roll 34 and the endless metal belt 35.

The pressure to be yielded by the inner cooling pressure roll 37 may be from 5 to 50 kg/cm$^2$, preferably from 20 to 40 kg/cm in terms of a line pressure, or may be from 5 to 30 kg/cm$^2$, preferably from 10 to 20 kg/cm$^2$ in terms of a plane pressure. If the pressure is too small, a sheet or film having good transparency and surface gloss cannot be obtained. On the contrary, if it is too large, the sheet or film will be oriented or a large-scale device will be needed for the process. Such are unfavorable.

As mentioned above, the inner cooling pressure roll 37 pushes the endless metal belt 35 from its inside whereby the sheet or film 33 is pressed between the cooling roll 34 and the endless metal belt 35. Next, the thus-pressed sheet or film 33 is released from the contact with the cooling roll 34 and then moved along with the endless metal belt 35 while being adhered thereto, and thereafter it is generally cooled with an auxiliary inner cooling roll 38 and an auxiliary outer cooling roll 39. After thus cooled, the sheet or film 33 is released from the endless metal belt 35. If not cooled with the rolls 38 and 39, the surface of the sheet or film 33 will be roughened by its peeling from the belt 35.

As the auxiliary cooling rolls, in general, used are the auxiliary inner cooling roll 38 and the auxiliary outer cooling roll 39. If desired, however, any one of these may be omitted. Anyhow, in this case, endless metal belt 35 shall be cooled to have a temperature falling within the range of from 10° to 50° C. with cooling roll(s).

In this process, the sheet or film 33 is released from contact with the cooling roll 34, after having been treated under pressure, it is desired that the direction of the released sheet or film 33 is towards the belt (or towards the endless metal belt 35). Namely, the sheet or film 33 shall be cooled to its softening temperature or lower while it is flat. If not, a flat sheet or film could not be obtained due to the uneven cooling. If the treated sheet or film adheres to the cooling roll 34, it is impossible to uniformly cool the sheet or film.

After cooled, the sheet or film 33 is wound up around a take-up roll (not shown) to be a final product. Before the winding, the sheet or film 33 may be annealed, using a heating roll or the like. By such annealing, curling of the treated sheet or film 33 may be prevented effectively. In this case, the annealing temperature may be generally from 80° to 130° C., preferably from 110° to 130° C., though varying depending on the material of the sheet or film.

The embodiment illustrated above employs the inner cooling pressure roll

Alternatively, an inner hydraulic pressure device 40 may be employed, as shown in FIG. 7, or planet rolls 41 may also be employed, as shown in FIG. 8. It is desired that these are also cooled.

The present invention will be explained in more detail by means of the following examples, which, however, are not intended to restrict the scope of the present invention.

EXAMPLES 1 TO 4

Using the device as shown in FIG. 1, an super-transparent thermoplastic resin sheet was produced.

First, a raw resin material composition prepared by adding 2000 ppm of DBS (1,3-, 2,4-dibenzylidene-sorbitol) (trade name: Gelall MD, produced by Shin-Nippon Rikagaku KK) as the nucleating agent to 100 parts by weight of propylene homopolymer (having a density of 0.91 g/cm$^3$, a melt index of 2.0 g/10 min) (Idemitsu Polypro F-205S) was heated, melted and plasticized in the T-die extruder 1 (diameter of the extruder=90 mm; L/D=32; width of the die=500 mm; distance between the die lips=1 mm) at resin temperature of 280° C., and then extruded through the T-die 2.

The thus-extruded sheet or film 3 (sheet or film from the resin melt) was brought into contact with and adhered to the cooling roll 4 (having a mirror-finished, hard chromium surface with a surface roughness of 0.2 µm), using the pressure roll 6, then directly introduced into the intermediate between the endless metal belt 5 (mirror-finished, endless stainless steel belt having a thickness of 0.4 mm and a surface roughness of 0.2 µm) and the cooling roll 4, moved, while kept in contact with the outer surface of the cooling roll 4 between the cooling roll 4 and the endless stainless belt 5, and pressed against the roll 4, while cooling the cooling roll 4 at the temperature indicated in Table 1 below. (The temperature of the inner cooling roll 7 was shown in Table 1 as the temperature of the endless metal belt 5.) The pressure imparted to the sheet or film 3 was calculated to be 1.5 kg/cm$^2$, on the basis of the tension of the endless metal belt 5.

Afterwards, the thus-pressed sheet or film 3 was released from the contact with the cooling roll 4 (whereupon the direction of the released sheet or film was towards the belt), further moved while adhered to the endless metal belt 5, and then cooled with the second auxiliary inner cooling roll 9 and the auxiliary outer cooling roll 10 (both having a temperature of 30° C.) to obtain a polypropylene resin sheet having a thickness of 0.3 mm. The conditions for the operation and the results obtained are shown in Table 1. The filming speed was 20 m/min.

Comparative Examples 1 and 2

The same process as in Examples 1 to 4 was repeated under the conditions shown in Table 1, except that the nucleating agent was not used. The conditions for the operation and the results obtained are shown in Table 1.

Comparative Examples 3 and 4

Figure 5:
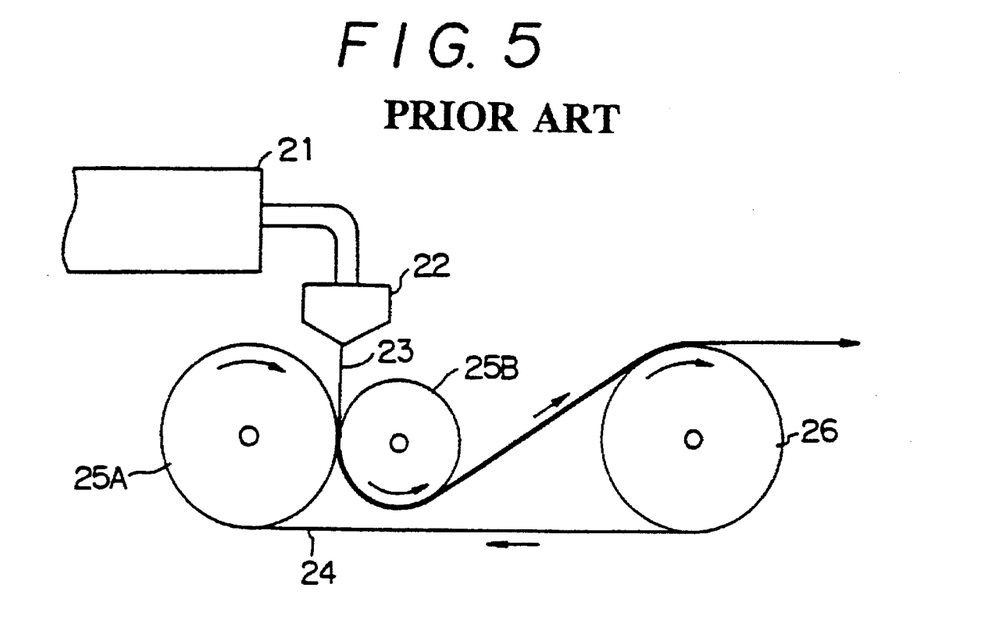
FIG. 5 is an explanatory view showing the device used in Comparative Examples 3 and 4.

The same process as in Examples 1 to 4 was repeated under the conditions shown in Table 1, except that the device of FIG. 5 (this is the same device as that described in Japanese Patent Application No. 4-27485) was employed.

More precisely, using the T-die extruder 21 (diameter of the extruder=90 mm; L/D=32; width of the die=500 mm; distance between the die lips=1 mm), the predetermined, raw resin material composition was extruded through the T-die 22. The thus-extruded sheet or film 23 (sheet or film from the resin melt) was directly introduced between the facing two cooling rolls 25A and 25B (both having a mirror-finished surface) between which stretched was the endless metal belt 24 (mirror-finished, endless stainless steel belt having a thickness of 0.6 mm and a surface roughness of 0.2 μm), while carried by the endless metal belt 24, to obtain a polypropylene resin sheet having a thickness of 0.3 mm. The conditions for the operation and the results obtained are shown in Table 1. In FIG. 5, 26 is an auxiliary roll.

Next, the thus-pressed sheet or film 33 was released from the contact with the cooling roll 34 (whereupon the direction of the released sheet or film was towards the belt), further moved while adhered to the endless metal belt 35, and then cooled with the auxiliary inner cooling roll 38 and the auxiliary outer cooling roll 39 (both having a temperature of 30° C.) to obtain a polypropylene resin sheet having a thickness of 0.7 mm. The conditions for the operation and the results obtained are shown in Table 1. The filming speed was 15 m/min.

Comparative Examples 5 and 6

The same process as in Examples 5 to 8 was repeated under the conditions shown in Table 2, except that the nucleating agent was not used. The conditions for the operation and the results obtained are shown in Table 2.

TABLE 1

| | Device Used | Additive | Temperature of Belt (°C.) | Temperature of Cooling Roll (°C.) | Generation of Bank Marks | Treated Sheet Total Haze | Treated Sheet Inside Haze |
|---|---|---|---|---|---|---|---|
| Ex. 1 | FIG. 1 | Nucleating Agent | 25 | 20 | No | 3.8 | 2.8 |
| Ex. 2 | FIG. 1 | Nucleating Agent | 30 | 25 | No | 4.2 | 3.1 |
| Ex. 3 | FIG. 1 | Nucleating Agent | 35 | 30 | No | 5.6 | 3.5 |
| Ex. 4 | FIG. 1 | Nucleating Agent | 40 | 35 | No | 5.8 | 3.8 |
| Co. Ex. 1 | FIG. 1 | Not Used | 20 | 10 | No | 10.8 | 9.5 |
| Co. Ex. 2 | FIG. 1 | Not Used | 25 | 17 | No | 12.4 | 11.2 |
| Co. Ex. 3 | FIG. 5 | Not Used | 20 | 20 | No | 12.1 | 11.5 |
| Co. Ex. 4 | FIG. 5 | Nucleating Agent | 25 | 20 | Yes | — | — |

EXAMPLES 5 TO 8

Using the device of FIG. 6, a super-transparent thermoplastic resin sheet was produced.

First, a raw resin material composition prepared by adding 2000 ppm of DBS(1,3-2,4-dibenzylidene-sorbitol) (trade name: Gelall MD, produced by Shin-Nippon Rikagaku KK) as the nucleating agent to 100 parts by weight of propylene homopolymer (having a density of 0.91 g/cm$^3$, a melt index of 2.0 g/10 min) (Idemitsu Polypro F-205S) was heated, melted and plasticized in the T-die extruder 31 (diameter of the extruder=90 mm; L/D=32; width of the die=500 mm; distance between the die lips=1 mm) at resin temperature of 280° C., and then extruded through the T-die 32.

The thus-extruded sheet or film 33 (sheet or film from the resin melt) was directly introduced into the intermediate between the endless metal belt 35 (mirror-finished, endless stainless steel belt having a thickness of 0.4 mm and a surface roughness of 0.2 μm) and the cooling roll 34 (having a mirror-finished, hard chromium surface with a surface roughness of 0.2 μm), and then moved, while kept in contact with the outer surface of the cooling roll 34 between the cooling roll 34 and the endless stainless belt 35 and while cooling the cooling roll 34 at the temperature indicated in Table 2 below. (The temperature of the inner cooling roll 36 and the inner cooling pressure roll 37 was shown in Table 1 as the temperature of the endless metal belt 35.) Afterwards, the sheet or film 33 was pressed against the roll 34 under the pressure shown in Table 2, from the inside of the endless metal belt 35.

Comparative Examples 7 and 8

The same process as in Examples 5 to 8 was repeated under the conditions shown in Table 2, except that the device of FIG. 6 (this is the same device as that described in Japanese Patent Application No. 4-27485) was employed.

Figure 9:
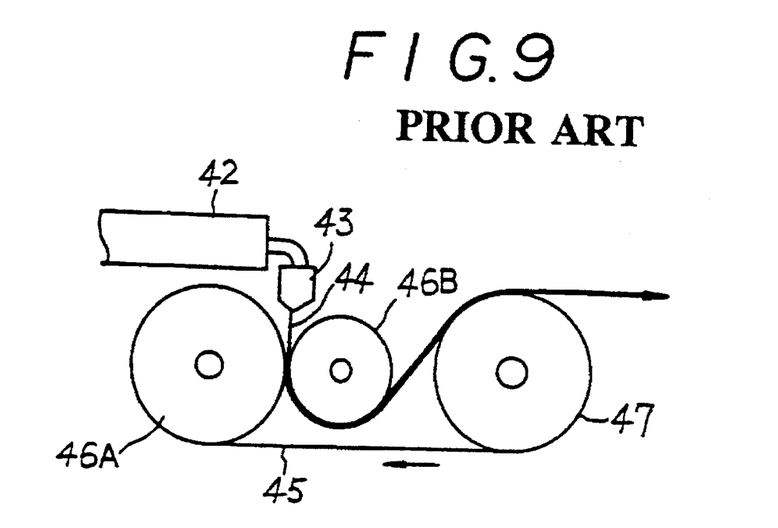
FIG. 9 is an explanatory view showing the device used in Comparative Examples 7 and 8.

More precisely, using the T-die extruder 42 (diameter of the extruder=90 mm; L/D=32; width of the die=500 mm; distance between the die lips=1 mm), the predetermined, raw resin material composition was extruded through the T-die 43. The thus-extruded sheet or film 44 (sheet or film from the resin melt) was directly introduced between the facing two cooling rolls 46A and 46B (both having a mirror-finished surface) between which stretched was the endless metal belt 45 (mirror-finished, endless stainless steel belt having a thickness of 0.4 mm and a surface roughness of 0.2 μm), while carried by the endless metal belt 45, to obtain a polypropylene resin sheet having a thickness of 0.7 mm. The conditions for the operation and the results obtained are shown in Table 2. In FIG. 9, 47 is an auxiliary roll.

TABLE 2

| | Device Used | Additive | Pressure Impared* | Temperature of Belt (°C.) | Temperature of Cooling Roll (°C.) | Generation of Bank Marks | Treated Sheet Total Haze | Treated Sheet Inside Haze |
|---|---|---|---|---|---|---|---|---|
| Ex. 5 | FIG. 6 | Nucleating Agent | 25 | 25 | 8 | No | 15.6 | 11.6 |
| Ex. 6 | FIG. 6 | Nucleating Agent | 25 | 30 | 14 | No | 15.9 | 11.7 |
| Ex. 7 | FIG. 6 | Nucleating Agent | 25 | 35 | 22 | No | 18.1 | 12.9 |
| Ex. 8 | FIG. 6 | Nucleating Agent | 25 | 40 | 28 | No | 19.8 | 14.3 |
| Co. Ex. 5 | FIG. 6 | Not Used | 25 | 20 | 10 | No | 56.8 | 50.1 |
| Co. Ex. 6 | FIG. 6 | Not Used | 25 | 25 | 17 | No | 60.1 | 54.8 |
| Co. Ex. 7 | FIG. 9 | Not Used | 25 | 20 | 20 | No | 56.4 | 51.3 |
| Co. Ex. 8 | FIG. 9 | Nucleating Agent | 50 | 25 | 8 | Yes | — | — |

*kg/cm (as line pressure)

According to the methods of the present invention that have been explained in detail hereinabove, a non-oriented thermoplastic resin sheet or film having high transparency and good surface gloss may be obtained efficiently, since the cooling temperature is low and the cooling speed is high.

The thermoplastic resin sheet or film to be obtained by the present invention has high transparency and good surface gloss, even though being thick.

Additionally, a high-transparent, thermoplastic resin sheet or film may be produced by the methods of the present invention, even though the filing speed is high.

Further, the methods of the present invention can be carried out, using simple and inexpensive devices.

Moreover, the thermoplastic resin sheet or film obtained by the methods of the present invention do not have any remarkable gels or fish eyes on its surface, and the thermoformability of the sheet or film is good.

Accordingly, the thermoplastic resin sheet or film obtained by the methods of the present invention is suitable for wrapping foods, medicines, etc. In addition, it may also be applied to pneumatic shaping or thermal shaping.

While the invention has been described in detail and with reference to specific embodiments thereof, it will be apparent to one skilled in the art that various changes and modifications can be made therein without departing from the spirit and scope thereof.

What we claimed is:

1. A method for producing a thermoplastic resin sheet or film comprising:
   (a) melting under heat a raw resin material containing one or more additives selected from the group consisting of a nucleating agent, fine powder of a high melting point polymer, a petroleum resin, a terpene resin and an organic peroxide to form a resin sheet or film, and
   (b) moving the resin sheet or film formed in step (a) into contact with a cooling roll having an outer mirror-finished surface and an endless moving metal belt having an outer mirror-finished surface and adhering the resin sheet or film either to (i) only the outer mirror-finished surface of the cooling roll prior to the resin sheet or film coming in contact with the endless moving metal belt or (ii) only the outer surface of the endless moving metal belt prior to the resin sheet or film coming into contact with the cooling roll, so that the resin sheet or film is moved between the outer surface of said cooling roll and the outer surface of said moving endless metal belt to press and cool the resin sheet or film.

2. The method as claimed in claim 1, wherein the thermoplastic resin sheet or film is pressed under a pressure of 1 kg/cm² or more.

3. A method for producing a thermoplastic resin sheet or film comprising:
   (a) melting under heat a raw resin material containing one or more additives selected from the group consisting of a nucleating agent, fine powder of a high melting point polymer, a petroleum resin, a terpene resin, an organic peroxide and a crystalline polypropylenic copolymer to form a resin sheet or film,
   (b) moving the resin sheet or film formed in step (a) into contact with a main cooling roll having a mirror-finished outer surface and into contact with an outer surface of a moving endless metal belt having a mirror-finished surface, said moving endless metal belt having opposite end portions, said contact occurring at a position between said opposite end portions of said moving endless metal belt, said opposite end portions of said moving endless metal belt being supported by respective support members, said support members being spaced from and out of contact with said main cooling roll,
   (c) pressing the resin sheet or film against said main cooling roll from an inside surface of said moving endless metal belt,
   (d) thereafter releasing the resin sheet or film from contact with said main cooling roll and
   (e) thereafter peeling the resin sheet or film from said mirror-finished outer surface of said moving endless metal belt.

4. The method as claimed in claim 1, wherein the thermoplastic sheet or film is selected from the group consisting of polypropylene, polyethylene, polyethylene terephthalate, polystyrene, polycarbonate, polyvinyl chloride and polymethylmethacrylate.

5. The method as claimed in claim 1, wherein the thermoplastic sheet or film is polypropylene.

6. The method as claimed in claim 4, wherein the thermoplastic sheet or film contains 0.5 to 10,000 ppm by weight of a nucleating agent selected from the group consisting of talc, an organic carboxylic acid, a metal salt of an organic carboxylic acid, a metal salt of an organic phosphoric acid, a polyvinylcycloalkene and a dibenzylidene-sorbitol compound of the formula (I):

wherein R is an alkyl group having from 1 to 8 carbon atoms, a halogen atom or an alkoxy group having from 1 to 4 carbon atoms, and m and n each is an integer of from 0 to 3.

7. The method as claimed in claim 4, wherein the thermoplastic resin contains a fine powder of a high melting point polymer having a melting point of 200° C. or higher, said polymer being selected from the group consisting of polycarbonate and nylon, said polymer having a particle size of 1 μm or less, and said polymer being contained in an amount of 0.5 to 10,000 ppm by weight.

8. The method as claimed in claim 4, wherein the thermoplastic sheet or film contains an aliphatic petroleum resin having a molecular weight of 500 to 5,000 and a softening point of 50 to 170° C. or a terpene resin, wherein said aliphatic petroleum resin or terpene resin is in an amount of 3 to 30% by weight, relative to the raw resin.

9. The method as claimed in claim 4, wherein the thermoplastic sheet or film contains an organic peroxide selected from the group consisting of 2,5-dimethyl-2,5-di(tbutylperoxy)hexane, 1,1-bis(t-butylperoxy)-3,3,5-trimethylcyclohexane, t-butylperoxy-isopropyl carbonate, t-butylperoxy-3,3,5-trimethylhexanoate and 1,3-bis(2-tbutylperoxyisopropyl)benzene.

10. The method as claimed in claim 4, wherein the melting is carried out at a temperature of 200° to 280° C.

11. The method as claimed in claim 4, wherein the endless metal belt runs at a speed of 18 to 36 m/minute.

12. The method as claimed in claim 11, wherein the endless belt has a surface roughness of 3.0 μm or less.

13. The method as claimed in claim 12, wherein the endless metal belt and the cooling roll are at a temperature of 10° to 90° C., and the temperature of the endless metal belt is higher than the temperature of the cooling roll by 5° C. or more.

14. The method as claimed in claim 1, wherein pressure is applied to an inside surface of said endless moving metal belt, so that the outer surface of said endless moving belt presses the resin sheet or film against a curved surface portion of the outer surface of said cooling roll.

15. The method of claim 14, wherein the pressure is applied by a plurality of rollers spaced along a peripheral surface of the cooling roll.

16. The method of claim 14, wherein the pressure is applied by a positive pressure pneumatic device.

17. The method as claimed in claim 3, wherein the thermoplastic sheet or film is selected from the group consisting of polypropylene, polyethylene, polyethylene terephthalate, polystyrene, polycarbonate, polyvinyl chloride and polymethylmethacrylate.

18. The method as claimed in claim 3, wherein the thermoplastic sheet or film is polypropylene.

19. The method as claimed in claim 17, wherein the thermoplastic sheet or film contains 0.5 to 10,000 ppm by weight of a nucleating agent selected from the group consisting of talc, an organic carboxylic acid, a metal salt of an organic carboxylic acid, a metal salt of an organic phosphoric acid, a polyvinylcycloalkene and a dibenzylidene-sorbitol compound of the formula (I):

wherein R is an alkyl group having from 1 to 8 carbon atoms, a halogen atom or an alkoxy group having from 1 to 4 carbon atoms and m and n each is an integer of from 0 to 3.

20. The method as claimed in claim 17, wherein the thermoplastic resin contains fine powder of a high melting point polymer having a melting point of 200° C. or higher, said polymer being selected from the group consisting of polycarbonate and nylon, said polymer having a particle size of 1 μm or less, and said polymer being contained in an amount of 0.5 to 10,000 ppm by weight.

21. The method as claimed in claim 17, wherein the thermoplastic sheet or film contains an aliphatic petroleum resin having a molecular weight of 500 to 5,000 and a softening point of 50° to 170° C. or a terpene resin, wherein said aliphatic petroleum resin or terpene resin is in an amount of 3 to 30% by weight, relative to the raw resin.

22. The method as claimed in claim 17, wherein the thermoplastic sheet or film contains an organic peroxide selected from the group consisting of 2,5-dimethyl-2,5-di(tbutylperoxy)hexane, 1,1-bis(t-butylperoxy)-3,3,5-trimethylcyclohexane, t-butylperoxy-isopropyl carbonate, t-butylperoxy-3,3,5-trimethylhexanoate and 1,3-bis(2-t-butylperoxyisopropyl)benzene.

23. The method as claimed in claim 17, wherein the thermoplastic sheet or film contains a crystalline polypropylenic copolymer, selected from the group consisting of (i) an ethylenepropylene random copolymer having a melt index of 10 g/10 minutes or less and containing ethylene in an amount of 1 to 20% by weight, (ii) an ethylene-propylene block copolymer having a melt index of 10 g/10 minutes or less and containing ethylene in an amount of 1 to 40% by weight and (iii) a combination thereof, said crystalline polypropylenic copolymer being contained in an amount of 0.2 to 40 parts by weight, relative to the weight of the raw resin.

24. The method as claimed in claim 23, wherein the endless metal belt has a surface roughness of 1.5 μm or less.

25. The method as claimed in claim 24, wherein the endless metal belt and the cooling roll are at a temperature of 120° to 50° C., and the temperature of the endless metal belt is higher than the temperature of the cooling roll by 5° C. or more.

26. The method as claimed in claim 14, wherein pressure is applied to an inside surface of said endless moving metal belt, so that the outer surface of said endless moving metal belt presses the resin sheet or film against a curved surface portion of the outer surface of said cooling roll.

27. The method as claimed in claim 26, wherein the pressing is carried out by a plurality of rollers spaced along a peripheral surface of the cooling roll.

28. The method as claimed in claim 26, wherein the pressing is carried out by a positive pressure pneumatic device.

29. The method as claimed in claim 1, wherein the thermoplastic resin sheet or film is pressed against the cooling roll by a pressure roll.

* * * * *